Figure 1:
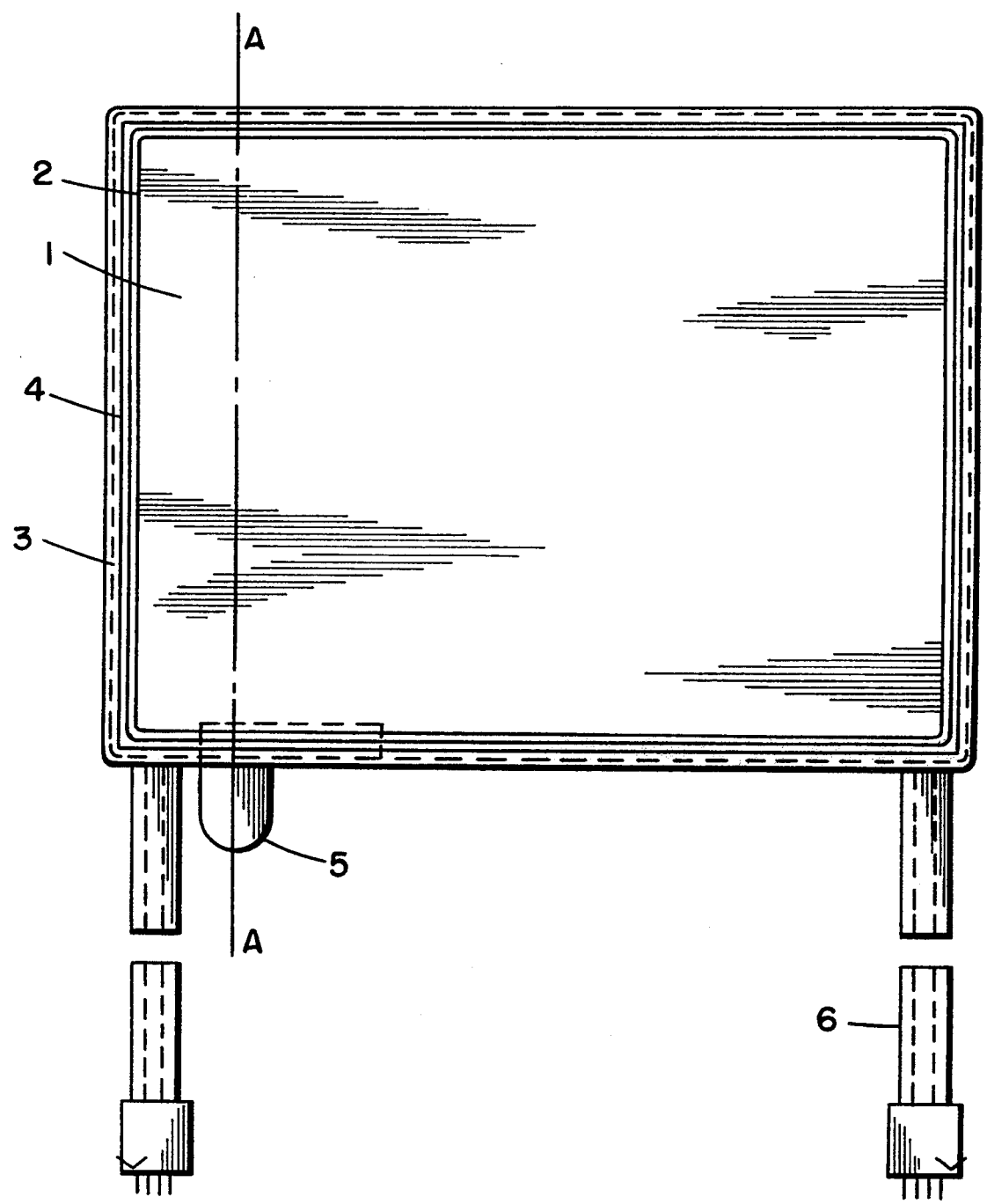

United States Patent [19]
Schmidt et al.

[11] Patent Number: 5,364,673
[45] Date of Patent: Nov. 15, 1994

[54] TRANSPARENT PLATE-SHAPED COMPONENT HAVING A STEPPED EDGE TOTALLY SURROUNDED BY A SEAL

[75] Inventors: Manfred Schmidt, Deckenpfron; Klaus Staudenmaier, Gechingen; Joachim Schnee, Weil im Schoebuch2; Walter Mannsdoerfer, Aidlingen; Volker Weber, Weilheim/Teck, all of Germany

[73] Assignee: International Business Machines Corporation, Armonk, N.Y.

[21] Appl. No.: 920,099

[22] Filed: Jul. 24, 1992

[30] Foreign Application Priority Data

Aug. 14, 1991 [DE] Germany .................. 4126909

[51] Int. Cl.$^5$ .................................. B32B 9/00
[52] U.S. Cl. .............................. 428/34; 428/38; 428/58; 428/60; 428/81; 428/119; 428/192; 428/423.1; 156/107; 156/109; 52/788; 52/790
[58] Field of Search ............. 428/34, 81, 192, 119, 428/38, 58, 60, 423.1; 156/109, 107; 52/788, 790; 264/271.1, 252

[56] References Cited

U.S. PATENT DOCUMENTS

| | | | |
|---|---|---|---|
| 4,551,372 | 11/1985 | Kunert | 428/38 |
| 4,961,975 | 10/1990 | Bejnar | 428/34 |
| 5,061,531 | 10/1991 | Catalano | 428/34 |
| 5,106,663 | 4/1992 | Box | 428/192 |

FOREIGN PATENT DOCUMENTS

| | | |
|---|---|---|
| 0121481A1 | 10/1984 | European Pat. Off. . |
| 3206884C2 | 10/1986 | European Pat. Off. . |
| 0205166A2 | 12/1986 | European Pat. Off. . |
| 0121481 | 1/1988 | European Pat. Off. . |
| 0325098A1 | 7/1989 | European Pat. Off. . |
| 0205166 | 8/1989 | European Pat. Off. . |

*Primary Examiner*—Patrick J. Ryan
*Assistant Examiner*—Abraham Bahta
*Attorney, Agent, or Firm*—Perman & Green

[57] ABSTRACT

The plate-shaped component (1) has a sealing (2) surrounding its side faces (2a) and is easily exchangeable. The surrounding sealing (2) is an integral part of component (1) and has varying thicknesses along its length. This allows compensating for dimensional variations of the plate-shaped component (1) by suitable production processes, such as casting or spraying, and keeping the fixed external dimensions of the component (1) surrounded by sealing (2). An overhanging area (3), positioned on component (1) and surrounded by sealing material, serves as a stop and permits component (1) to be flush-mounted in a housing (7) from the inside. A wedge-shaped elevation (4) of sealing material, which acts as a pinch or fold and is positioned in the overhanging area (3), improves the flush mounting still further. For outdoor installation, the plate-shaped component (1) may be additionally provided with heating as well as temperature measuring means (5, 8). For this purpose, the component may comprise connecting electrodes for power supply as well as heating wires extending therebetween, or an areal oxide layer suitable for the same purpose, which, if required, may be a transparent and thus invisible layer.

10 Claims, 3 Drawing Sheets

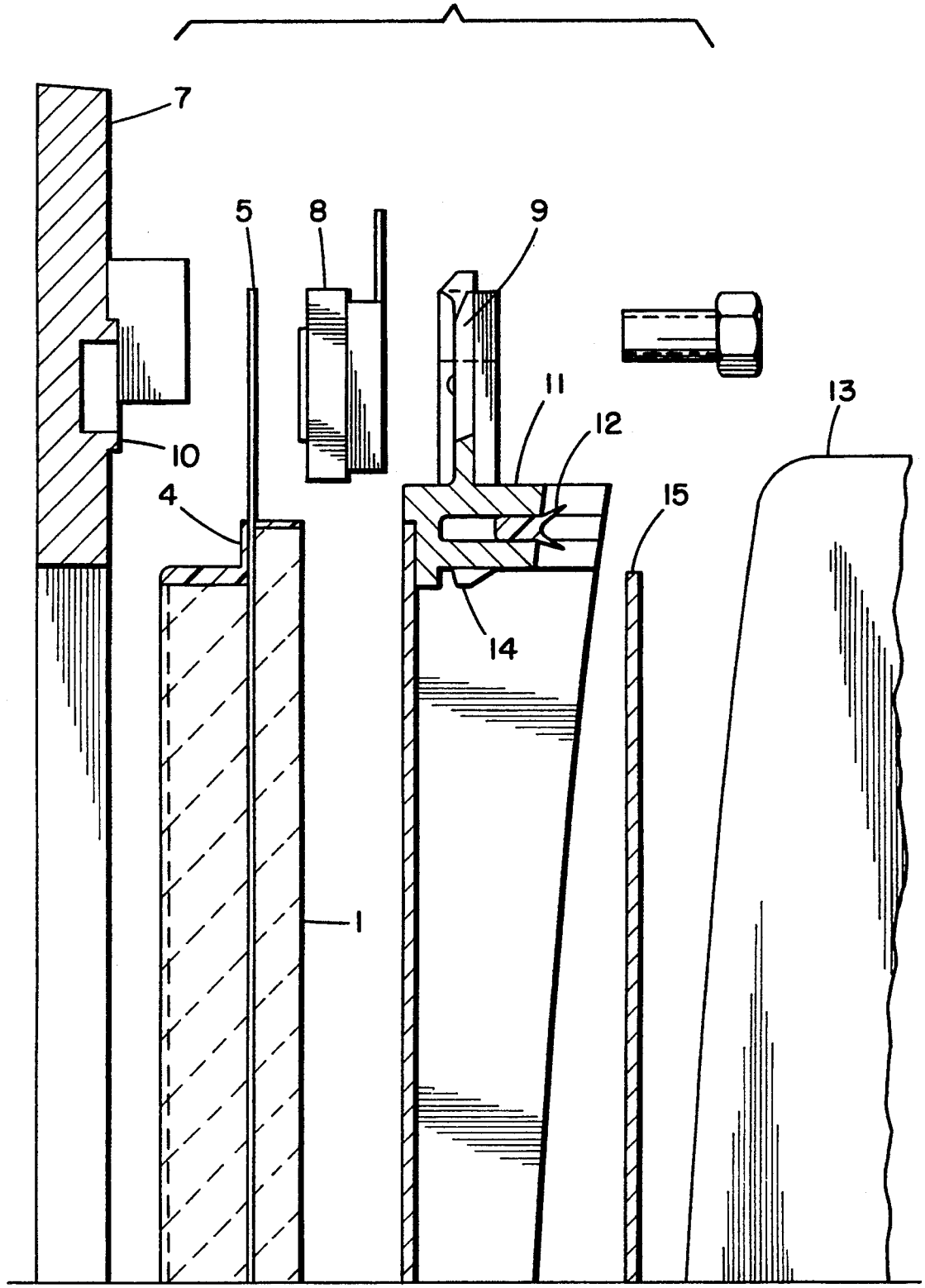

TRANSPARENT PLATE-SHAPED COMPONENT HAVING A STEPPED EDGE TOTALLY SURROUNDED BY A SEAL

The invention concerns a plate-shaped component, in particular a disk, with a sealing surrounding its lateral faces. The plate-shaped component is suitable for installation in a holding fixture provided for that purpose.

For inserting plate-shaped components, mostly glass panes, into a holding fixture, frequently a frame, provided for that purpose, different adhesion methods are used.

European Patent EP 0 121 481 B1 describes a two-stage adhesion method, wherein, initially, a first adhesive compound, curable by humidity, is applied to the glass pane to be mounted, and a second adhesive compound is applied to the first, previously cured, adhesive compound or to the frame immediately before the pane is inserted therein.

In the equipment described in German Patent DE 32 06 884 C2, a security pane is permanently, but up to a point flexibly, mounted in a profile frame. For this purpose, the rim of the security glass pane is positioned between two sealing strips, and its corners are forced into a curable, rubber elastic compound. According to European Patent EP 0 205 166 B1, the side faces of a front pane are surrounded by a frame. The space between the frame and the side faces is filled with a viscoelastic compound which may consist, for example, of polyurethane.

In the above-mentioned examples, the glass, security or front panes are permanently connected to a frame surrounding them and are not individually exchangeable without that frame. In addition, the joints filled with adhesive are optically unpleasing to look at.

The object of the present invention is to provide a readily exchangeable plate-shaped component with a sealing surrounding its side faces.

This object is accomplished in a favourable manner by the features specified in claim 1. In accordance therewith, the invention consists of a plate-shaped component which is destined for installation in a holding fixture provided for that purpose. The side faces of the plate-shaped component are surrounded by a sealing which is preferably applied by casting or spraying and which is an integral part of the plate-shaped component. Advantageous embodiments of this typical solution are specified in the subclaims. The advantages obtainable therewith are either obvious or are described in detail below.

The plate-shaped component may be made of different materials, in particular glass or security glass. It is suitable for indoor and outdoor use, for example, as a front pane for display units and image screens, as a keyboard element of a telephone apparatus or as a window pane, in particular a car window or screen. The plate-shaped component may consist of a single layer or a laminate made up of several layers.

Because of its special production process - casting or spraying, in particular low-pressure spraying - the surrounding sealing, which must not be completely closed, adheres so well to the side faces of the plate-shaped component that it forms an integral part thereof. The side faces of the component are preferably treated with an adhesion promoter prior to applying the sealing. The component provided with the sealing is easy to handle and equally easy to install in or, if required, remove from a holding fixture, such as a frame, provided for that purpose. In a preferred embodiment, the surrounding sealing has a rounded edge. This is important above all for the edge of the side face which is used as a leading edge to install the plate-shaped component in the holding fixture. The rounded edges, as an additional joining aid, are self-centering and allow easy and damage-free installation of the sealing even under poor lighting conditions, for example, inside a device.

The special production process for the surrounding sealing, such as filling a frame enclosing the plate-shaped component with sealing material, ensures that predetermined external dimensions, for example, those of the holding fixture, are accurately kept. Dimensional variations of the plate-shaped component are thus compensated for by the sealing whose thickness varies along its length.

The sealing material has adequate elastic properties so that dimensional tolerances, if any, are readily compensated for upon insertion into a holding fixture. If the sealing material is also resistant and impervious to moisture and insensitive to temperature variations and ultraviolet light, the plate-shaped component may also be installed in devices or holding fixtures for outdoor use. Sealing materials with such properties include polyurethane and RTV (room temperature vulcanized) silicone rubber. The plate-shaped component may be provided with an element overhanging one or several of its side faces, with the overhanging area being also surrounded by the sealing. This allows the component to be flush-mounted in a housing from the inside, since the overhanging area acts as a stop and permits a contact pressure, produced by suitable means, to be applied to the component. In the region of the overhanging face, there may also be a wedge-shaped elevation consisting of the material of the surrounding sealing and which either surrounds the plate-shaped component or extends parallel to one or several of its side faces. This wedge-shaped elevation, acting as pinch or fold during installation in a housing, allows a particularly flush assembly of the plate-shaped component, eliminating optically undesirable gaps between the installed component and the inner edge of the housing or the frame edge. The absence of such gaps prevents the ingress of detrimental moisture as well as the freezing up of the housing without using additional means, such as troublesome and ugly joints. As a result, the component is highly suitable for outdoor use. The optically pleasing appearance of the installed component and the housing blending into each other is a safeguard against vandalism particularly in outdoor installations. For such installations, the plate-shaped component may additionally be provided with suitable temperature heating and measuring means. For this purpose, it may be fitted with connecting electrodes for power supply as well as with heating wires extending therebetween or with an areal oxide layer serving the same purpose and which, if required, may be formed as a transparent and thus invisible layer. This allows heating the component at a particular temperature to prevent the formation of ice or water condensation, so that the component still functions at extremely low outside temperatures. For indoor applications, the heating and temperature measuring means may be dispensed with.

Figure 2:
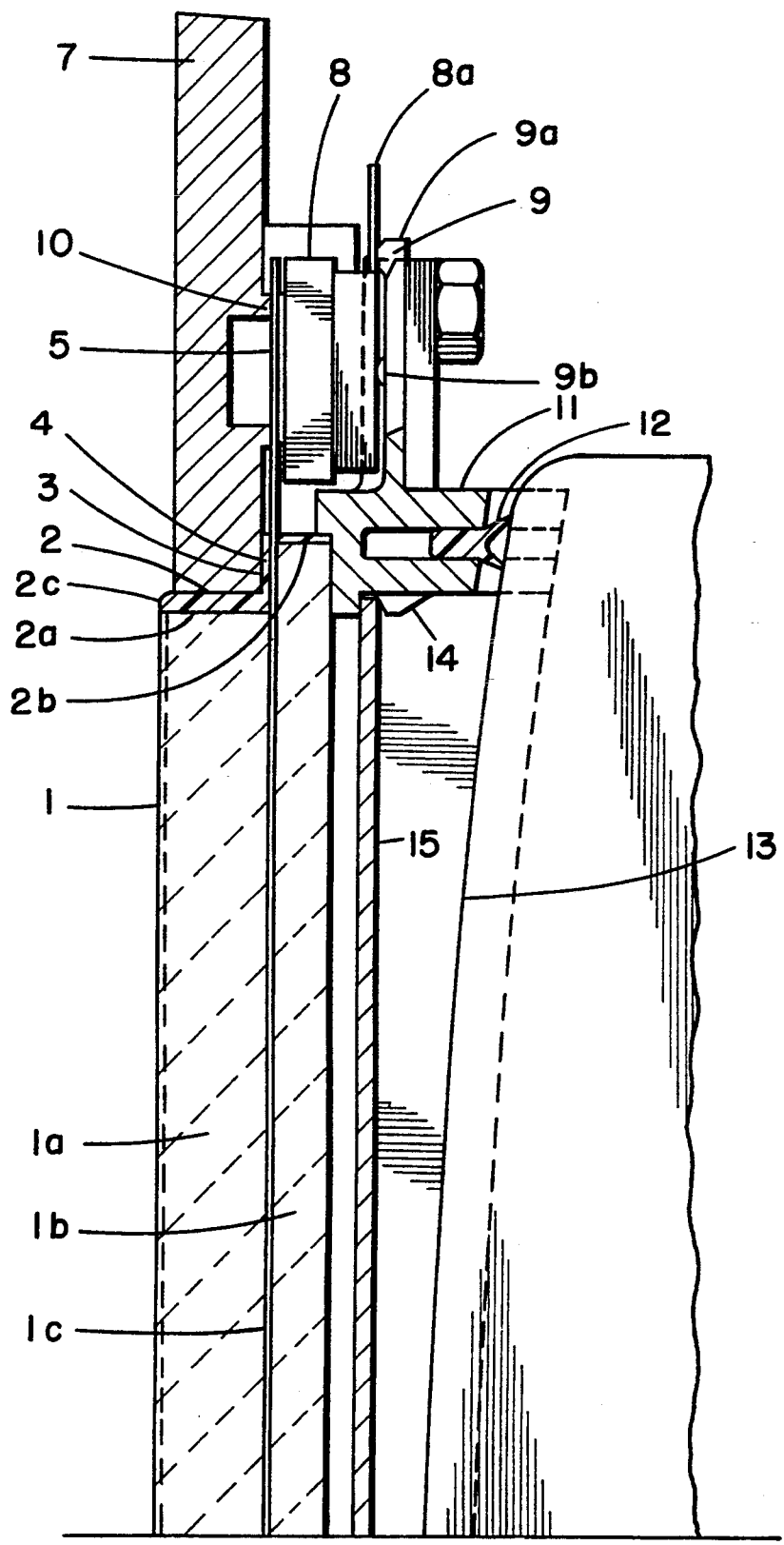

One of several conceivable examples is shown in the drawings (FIGS. 1 to 3) and will be described in detail below with reference thereto, in which FIG. 1 is a plan view of a heatable security glass pane;

FIG. 2 is a section along line A—A in FIG. 1 through the heatable security glass pane and parts of the holding fixture provided therefor, and FIG. 3 shows the same sectional view as FIG. 2, but with the individual components spread apart to illustrate the structural layout.

The plate-shaped component 1 in FIG. 1 is an antistatic, mar- and impact-resistant security glass pane. It is surrounded on its side faces 2a by a sealing 2 which also surrounds the overhanging area 3. In this example, the two side faces 2b of the overhanging part are additionally surrounded by the sealing. From the standpoint of functional efficiency, this constitutes a slight simplification which is of no significance to the operation of the plate-shaped component.

In the area of the overhanging face 3, a wedge-shaped circumferential elevation of sealing material is arranged. From the outside, a lug 5 of aluminium protrudes into the security glass pane 1, and a flexible flat cable 6 supplies voltage to the invisible heating layer of transparent oxide.

The sectional view of FIG. 2 shows that the security glass pane 1 is made up of two glass panes 1a, 1b bonded by a laminate 1c. Panes 1a and 1b are sized so that when joined, they create a stepped edge about their bounding lateral surface. The laminate 1c consists of polyvinyl butyral which acts as an adhesive at a pressure of about 9 bar and which is highly sensitive to moisture, acids, purifiers or plasticizers in the sealing. Therefore, the material chosen for the surrounding sealing 2 is a polyurethane with a Shore hardness A of 50±5. This material is temperature-resistant in the range from −40°to +85° C. and UV-stable, as was proved by a halogen light test.

The overhanging face 3 serves as a support and to fix the security glass pane in a frame 7 which in this case is made, for example, of a plastic material.

The internal dimensions of the frame 7 are decisive for the metal frame used to produce the surrounding sealing. The frame employed for the casting process is made of aluminium and is coated with teflon to protect the inserted glass pane at its support points. The glass pane 1, treated with an adhesion promoter on the side faces 2a to be coated, is inserted in that frame, and the space between the glass pane 1 and the inner edge of the cast frame is filled with sealing material. This process permits dimensional variations of the glass pane and, in addition, does not call for the glass pane inserted in the cast frame to be accurately centered. As a result, the external dimensions of the security glass pane, which at that stage is provided with the surrounding sealing, substantially correspond to the internal dimensions of the holding fixture, in this case frame 7, provided for installation. By using a sealing material with excellent elastic properties, the security glass pane 1 to be installed in frame 7 is easily adaptable also in cases where the internal dimensions of the cast frame are subject to slight tolerances over those of the frame 7 to be accommodated.

Between the glass panes 1a, 1b, the about 0.4 mm thick aluminium lug 5 projects by about 2 to 3 mm into the security pane 1 and dissipates the heat of the security glass to a temperature switch 8. The temperature switch is retained by a plastic spring 9 with spring catches 9a and pressure domes 9b and forced against the relatively thin aluminium lug 5 which in turn is forced against an abutment 10, formed as an annular face, in housing frame 7. By withdrawing the spring catch 9a, the temperature switch 8 is very easy to remove in an upward direction to replaced.

The temperature switch 8 contains a bimetal switch which in response to a predetermined temperature opens or closes a terminal 8a through which the heating current is fed, thus turning the heating on or off.

A holding frame 11 contains, in addition to the plastic spring 9, a dust seal 12 for an image screen 13 as well as a holding means 14 for fixing a privacy filter 15. All these components are integral parts of a cash dispenser which is used by bank customers, for example, to withdraw money or to find out and print their current balance. The image screen 13, a cathode ray tube, is used as a display for the relevant data. In the described example, the image screen surface is positioned closely adjacent to the security glass pane 1, which substantially avoids parallax errors. In addition, the screen surface is protected by the seal 12. The holding frame 7 produces the contact pressure for sealing the security glass 1 against the housing frame 7. Flush installation of the security glass pane 1 as a front plate ensures a tightness of IP 65, as verified in a standard rain test and during the spraying with water at 0.7 bar at a distance of 1 m and an angle of incidence of 45°.

We claim:

1. A holding fixture and plate arrangement wherein said holding fixture surrounds said plate, said arrangement comprising:
   a plate having planar surfaces and a continuous bounding lateral surface that includes a stepped edge, a portion of said stepped edge parallel to a major surface of said plate; and
   sealing material adherent to and entirely covering said continuous bounding lateral surface and forming an integral structure therewith, for providing a seal between said lateral surface and said fixture, said sealing material present on and extending from said portion of said stepped edge in the form of a wedge-shaped circumferential elevation, thereby providing improved sealing to said holding fixture.

2. The arrangement as recited in claim 1 wherein said surrounding sealing material has a rounded edge.

3. The arrangement as recited in claim 1 wherein said sealing material is elastic, waterproof and substantially insensitive to temperature variations and ultraviolet light.

4. The arrangement as recited in claim 3 wherein said sealing material is polyurethane with a Shore hardness A of 50, ±5.

5. The arrangement as recited in claim 1 wherein said plate comprises a pair of glass panes, bonded by a laminate.

6. The arrangement as recited in claim 5 wherein a layer of resistive material is positioned between said glass panes and a power supply cable is connected to said layer.

7. The arrangement as recited in claim 6 wherein said layer is a transparent oxide.

8. The arrangement as recited in claim 7, further comprising:
   a lug of thermally conductive metal protruding from said continuous bounding lateral surface of said pair of glass plates, for dissipating heat from said glass plates;
   a temperature switch positioned in contact with said lug and forcing said lug against a surface of said holding fixture; and means for biasing said temperature switch against said lug so as to maintain physical contact therebetween.

9. The arrangement as recited in claim 8 wherein said lug protrudes about 2–3 mm between said glass panes and has a thickness ranging from 0.36 to 5 mm.

10. The arrangement as recited in claim 9 wherein said arrangement provides a protective shield for an image screen in a cash dispenser.

* * * * *